(12) United States Patent
Junginger et al.

(10) Patent No.: US 12,008,295 B2
(45) Date of Patent: Jun. 11, 2024

(54) METHOD AND DEVICE FOR CREATING A MODEL OF A TECHNICAL SYSTEM FROM MEASUREMENTS

(71) Applicant: Robert Bosch GmbH, Stuttgart (DE)

(72) Inventors: Andrej Junginger, Stuttgart (DE); Holger Ulmer, Ulm (DE); Jens Stefan Buchner, Bietigheim-Bissingen (DE); Patrick Engel, Leonberg (DE); Sebastian Boblest, Duernau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 662 days.

(21) Appl. No.: 17/157,144

(22) Filed: Jan. 25, 2021

(65) Prior Publication Data
US 2021/0264075 A1     Aug. 26, 2021

(30) Foreign Application Priority Data

Feb. 24, 2020 (DE) .......................... 102020202335.2

(51) Int. Cl.
| | |
|---|---|
| *G06F 30/20* | (2020.01) |
| *B60R 16/023* | (2006.01) |
| *G06F 30/27* | (2020.01) |
| *G06F 111/10* | (2020.01) |

(52) U.S. Cl.
CPC .......... *G06F 30/20* (2020.01); *B60R 16/0231* (2013.01); *G06F 30/27* (2020.01); *G06F 2111/10* (2020.01)

(58) Field of Classification Search
CPC ... G06F 30/20; G06F 2111/10; B60R 16/0231
See application file for complete search history.

(56) References Cited

PUBLICATIONS

Glaenzel, J., Ihlenfeldt, S., Naumann, C., & Putz, M. (2018). Efficient quantification of free and forced convection via the decoupling of thermo-mechanical and thermo-fluidic simulations of machine tools. Journal of Machine Engineering, 18. (Year: 2018).*
Glänzel, J., Naumann, A., & Kumar, T. S. (2019). Parallel computing in automation of decoupled fluid-thermostructural simulation approach. arXiv preprint arXiv:1910.13939. (Year: 2019).*
Priber, U., "Smoothed Grid Regression," Proceedings Workshop Fuzzy Systems, vol. 13, 2003 pp. 1-14.
Günther, Marco, et al., "Prinzipien Der Mathematischen Modellierung," From Mathematische Modellbildung Und Simulation, Erste Auflage, Wiley-VCH Verlag GMBH & Co. KRAA, 2014, pp. 1-42 (English Machine Translation at pp. 43-78).

* cited by examiner

*Primary Examiner* — Bijan Mapar
(74) *Attorney, Agent, or Firm* — NORTON ROSE FULBRIGHT US LLP; Gerard A. Messina

(57) ABSTRACT

A method for creating a model of a technical system as a function of measured sensor data of the technical system. The method includes the following steps: initializing a symbolic regression problem. A list of mathematical functions is established, including at least one linear and/or non-linear function and/or at least a one-dimensional parameterizable characteristic curve. The at least one-dimensional characteristic curve is implemented by a Smoothed Grid Regression (SGR) model. Solving the symbolic regression problem with the aid of a genetic algorithm.

13 Claims, 6 Drawing Sheets

| Functional Expressions | Complexity |
|---|---|
| $x+y, x-y, x*y, x/y$ | 2 |
| $x^2, \sqrt{|x|}$ | 5 |
| $|x|^{a_1}$ | 8 |
| $\sin(a_1 x), \cos(a_1 x), \tan(a_1 x)$ | 8 |
| $\exp(a_1 x)$ | 8 |
| $\log(|x|)$ | 5 |
| $\min(x, y), \max(x, y)$ | 2 |
| $\text{gaussian}(x, a_1, a_2)$ | 11 |
| $\text{sigmoid}(x)$ | 5 |
| 1D Curve with 10 sampling points | 20 |
| 2D Map with 3x3 sampling points | 18 |
| 2D Map with 5x5 sampling points | 50 |

Fig. 3

METHOD AND DEVICE FOR CREATING A MODEL OF A TECHNICAL SYSTEM FROM MEASUREMENTS

CROSS REFERENCE

The present application claims the benefit under 35 U.S.C. § 119 of German Patent Application No. 102020202335.2 filed on Feb. 24, 2020, which is expressly incorporated herein by reference in its entirety.

FIELD

The present invention relates to a method for creating a model of a technical system from measurements, and to a device, a computer program and a machine-readable memory medium.

BACKGROUND INFORMATION

The development of regulating strategies for components of technical or physical systems requires mathematical models, which describe these components. The application of these regulating strategies on an industrial scale by using them in embedded control units is, however, currently possible only to a very limited extent. The limitations arise as a result of a low interpretability of these models, low accuracy, usually high computing power and memory consumption and low generalizability of these models to similar systems. Popular modeling techniques, such a neural networks or Gaussian process models are able, however, to overcome only some of the aforementioned limitations. It is desirable, however, to overcome all the aforementioned limitations and to be able to provide a model, with the aid of which it is then possible to develop and carry out reliable and exact control strategies.

Priber, U. "Smoothed Grid Regression." Proceedings Workshop Fuzzy Systems. Vol. 13. 2003, describes a Smoothed Grid Regression (SGR) model.

SUMMARY

In accordance with an example embodiment of the present invention, a method is provided, which automatically ascertains from measured sensor data a, in particular, data-based model of a component of the technical system or the technical system as such and overcomes the aforementioned limitations. The method is generates simple and exact models that are on a Pareto front in a particularly fast manner.

In one first aspect, the present invention relates to a computer-implemented method for creating a model of a technical system, such as of an electric motor or of an internal combustion engine. The model may be a data-based or mathematical model.

In accordance with an example embodiment of the present invention, the method includes the following steps: providing measured sensor data, which have been detected by different sensors. The different sensors may be structurally identical or structurally different sensors. The sensors may further characterize different properties of the technical system such as, for example, a torque, an output or a power consumption. This is followed by the step of initializing a model generator, in particular, of initializing a symbolic regression problem. A list of mathematical functions is also initialized. This list includes at least one linear and/or non-linear function and/or at least one one-dimensional parameterizable characteristic curve. The mathematical functions of the list are also referred to below as base functions. The list may also include trigonometric and/or exponential and/or logarithmic functions. It is noted that the at least one one-dimensional characteristic curve is implemented by a Smoothed Grid Regression model (SGR), in particular, in the models. The advantage of the SGR is its direct interpretability. In addition or alternatively, the characteristic curve in the list may be defined already by the SGR. This is followed by the step of solving of the symbolic regression problem with the aid of a genetic algorithm. In this step, multiple models from the list are combined with the mathematical functions, in particular, by the genetic algorithm, the combined models are then trained with the aid of an optimization method, in particular, with respect to their efficiency or with respect to their cost function, and the trained models are assessed as a function of a fitness function. The fitness function is a function of an efficiency of the model to be assessed and a function of a complexity of this model. It is noted that these above-mentioned steps for solving the symbolic regression problem may be carried out multiple times in succession. This is followed by the step of outputting the best models with respect to their fitness function as a function of their complexity. The best model is that model that has the highest fitness for a given complexity compared to the further models having the same complexity.

A one-dimensional characteristic curve may be understood to mean a curve, which maps an input variable onto an output variable. The curve may be a (linear) interpolation of a plurality of scan points or sampling points. The scan points or sampling points are optimized for the model. Similarly, a multi-dimensional characteristic curve is a bilinear interpolation. The one-dimensional or two-dimensional characteristic curve may also be referred to as a one-dimensional or two-dimensional characteristic map. Input/and output variables of the characteristic curve may have a physical meaning, for example, a current intensity or a torque. Alternatively, these variables may also be of an abstract nature.

A symbolic regression may be understood to mean the following. The symbolic regression is a type of regression analysis, which searches through the range of mathematical expressions in order to find the model that best matches a given sensor dataset, both with regard to accuracy and also to simplicity. No particular model is provided as a starting point for the algorithm. Instead, initial expressions are formed by (random) combinations of mathematical components such as mathematical operators, analytical functions, constants and state variables. New equations are then typically formed by the recombination of previous equations with the aid of evolutionary algorithms, such as a genetic algorithm. The advantage in this case, is that the human interpretability of the results of the symbolic regression methods is provided as compared to purely statistical modeling techniques (such as, for example, Gaussian processes or neural networks).

An efficiency of the model may be understood to mean a mathematical measure, which characterizes how well the model replicates the measured sensor variables ($y_{meas}$) via its output modeling variable ($y_{mod}$) as a function of further measured sensor variables.

The complexity of a model may be understood to mean a computing time or resource consumption, which is required in order to carry out the model and/or to store it on a memory.

It is provided that a local second-order optimization method (second-order optimizer) is used to optimize the combined model with respect to cost function (loss function). These optimization methods may, for example, be: the Levenberg-Marquardt method, 'Trust-region reflective' method or the 'dogbox' algorithm. The advantage is a faster convergence behavior in particular, in the Levenberg-Marquardt method in particular, the advantage is further a more robust convergence of the method.

It is further provided that a model is selected from the output models by a statistical analysis of data residues. This means that concordances of the sensor variables obtained from measurements and from the model prediction are assessed using the fitness function and a linear regression analysis. This may be carried out both for the training data as well as for the test data for assessing the optimization result, to the exclusion of overfitting and for assessing the generalization behavior of the model in the input set space.

It is further provided that a user of one of the outputted models is selected as a function of the fitness function and of the complexity. By selecting a model from the Pareto front, a user is able to make a choice, via which the model accuracy and model complexity may be balanced.

It is noted that the models are stored preferably as graphs and that the graphs are selected and mutated by the genetic algorithm. Once an optimal graph has been found, its corresponding model from this graph is initialized. This means, a parameterization of the graph is then transformed into the corresponding model.

It is further provided that an input value range of the model is adapted for each iteration step of the local optimization method. A value range of the input data at the respective node of the graph, for example, is evaluated and subdivided equidistantly for this purpose. This has the advantage that the model is automatically scaled to its input range, in order to maintain the consistency of the functional expressions in each optimization step.

It is further provided that a portion of the base functions of the list is selected by the user, in particular, as a function of his/her a priori knowledge about the technical system and about the sensor variable to be modeled. The advantage in this case is that the user incorporates his/her knowledge into the optimization problem. Thus, on the one hand, the model may become more accurate and, on the other hand, the optimization period and computing time on a control unit may be significantly reduced as a result.

It is further provided that one of the output models, in particular, the selected model, is stored on a control unit, the control unit ascertaining a control variable for the technical system using the stored model, and regulating the technical system preferably with the aid of this control variable.

In further aspects, the present invention relates to a computer program, which is configured to carry out the above methods, and to a machine-readable memory medium, on which this computer program is stored.

BRIEF DESCRIPTION OF THE DRAWINGS

Specific embodiments of the present invention are described in greater detail below with reference to the figures.

FIG. 3 schematically shows a list including possible mathematical base functions, in accordance with an example embodiment of the present invention.

DETAILED DESCRIPTION OF EXAMPLE EMBODIMENTS

Figure 1:
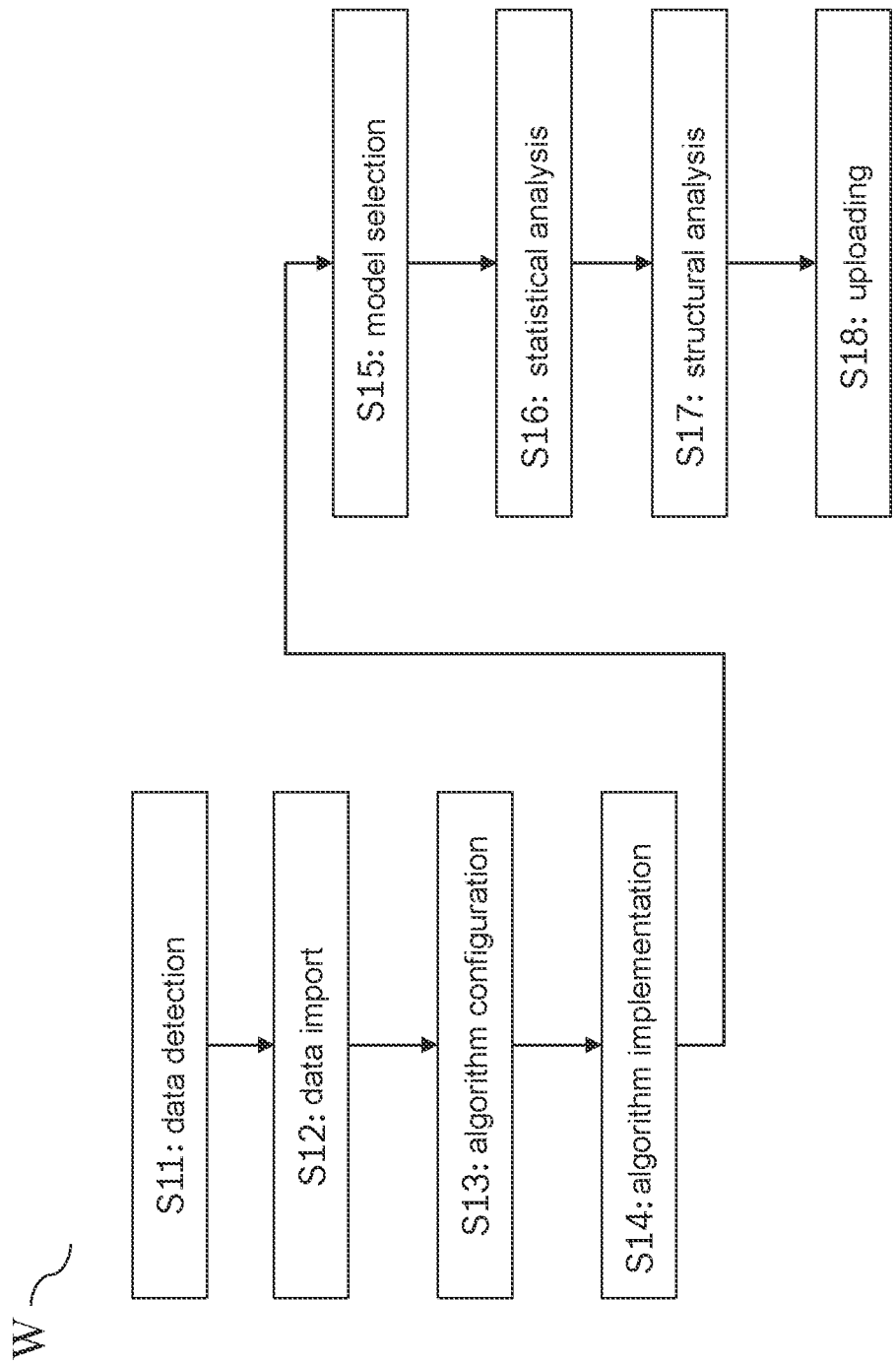
FIG. 1 schematically shows an overview of a workflow from the creation of a model based on measured sensor data up to the transfer of this model onto a control unit, in accordance with an example embodiment of the present invention.

FIG. 1 schematically shows an overview of a workflow W from the creation of a model based on measurements up to the transfer of this model onto a control unit.

Workflow W starts with step S11: "Data detection." In order to create a model for a technical or physical system, a suitable dataset must be detected or provided by a measurement. The dataset must include the sensor variable(s) of interest that characterize(s) the behavior of the system (output), as well as all further sensor variables that influence this behavior (inputs). The measurement preferably covers all operating points of the system that are to be represented by the model. In addition, the input variables should be varied in such a way that all significant variations in the output of the observed system are taken into account.

This is followed by optional step S12: "Data import." In this step, the data from step S11 may be processed in such a way that these are "clean." This means, for example, that all values are plausible and non-numerical values as well as errors of defective measuring devices may be removed from the data. In addition, the data may be divided into a training dataset and a test dataset in step S12.

This is followed by step S13: "Algorithm configuration." The actual symbolic regression problem is initially defined by establishing the target (output) set. In addition, it is possible to utilize previous knowledge by selecting all input variables, of which, for example, a user expects that these input variables have a potentially significant effect on the output variable. Secondly, the method for creating the model (see FIG. 2) is configured by the selection of its settings, for example, setting parameters of an evolutionary algorithm.

This is followed by step S14: "Implementation of algorithm." The symbolic regression problem is solved by carrying out the method according to FIG. 2. This method is carried out iteratively until a predefined abort criterion is achieved or a user interrupts the implementation. The latter may take place based on the results of the last iteration.

Figure 2:
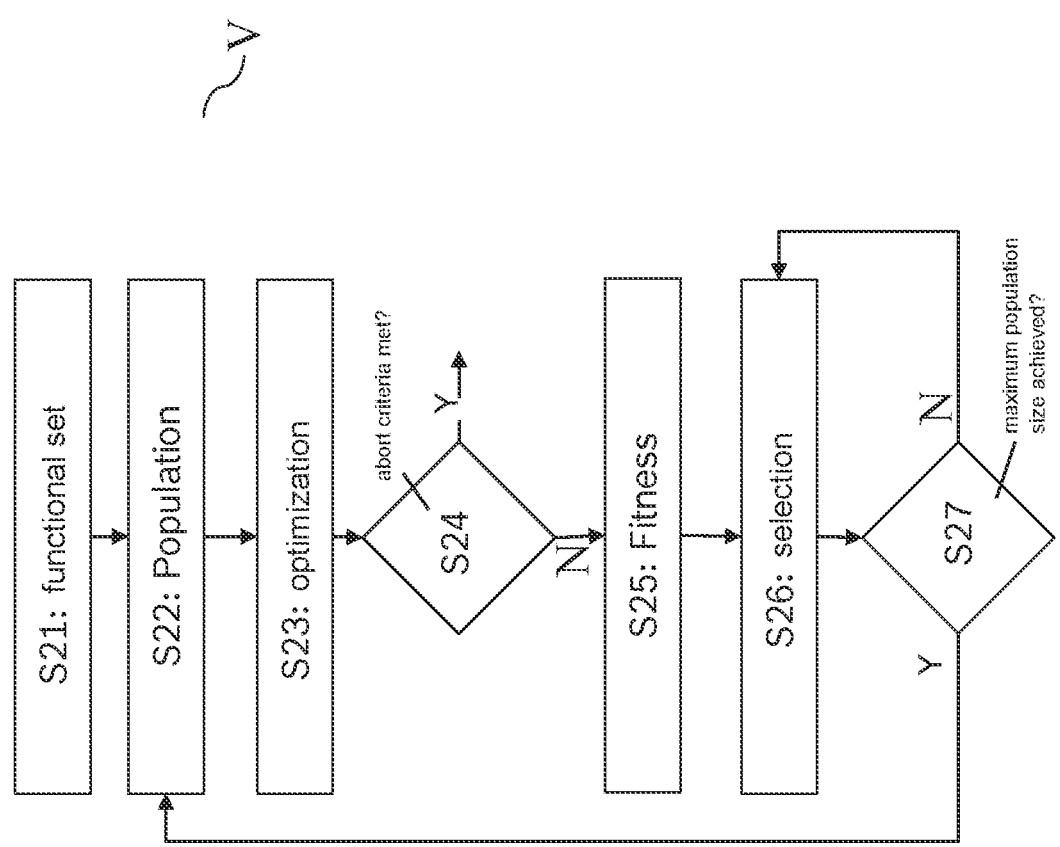
FIG. 2 schematically shows a flowchart of a method for creating the model with the aid of a genetic algorithm, in accordance with an example embodiment of the present invention.

This is followed by step S15: "Model selection." Once step S14 has been completed, the results of the method according to FIG. 2 are provided. These results are the models that are part of a Pareto set, which are spanned by a fitness function and a complexity of the model (see exemplary step S25). By selecting a model from the Pareto set, a user is able to make a choice with respect to a model-accuracy and model complexity.

This may be followed by step S16: "Statistical analysis." The efficiency of the output models may be assessed by carrying out a statistical analysis of data residue. This may be carried out both for the training data as well as for the test data, in order to assess the optimization result and/or to rule out an overfitting and/or to assess the generalization behavior of the model in the input set space.

This may be followed by step S17: "Structural analysis." The human interpretability of the results is an advantage of the symbolic regression methods as compared to purely statistical modeling techniques (such as Gaussian processes or neural networks). This step S17 offers the possibility of utilizing this advantage and of describing the behavior of the modeled system in detail. The model is analyzed both on a structural as well as on a semantic level by tracking the actual calculation steps. The same may be carried out for the parameters involved in the model by assessing their actual numerical values and by graphically studying curves, in particular characteristic curves, and maps, in particular characteristic maps.

This may be followed by step S18: "Uploading." In this step, the selected model according to one of steps S15 through S16 is converted into executable code and uploaded on an embedded device, such as a control unit. In this way, the model becomes part of a software for activating a system to be controlled. The control unit may be configured to ascertain a control signal as a function of at least one instantaneously detected sensor variable and using the selected model. The control signal may be used to activate an actuator of a technical system.

FIG. 2 shows by way of example a flowchart of a method V for creating the model with the aid of an evolutionary algorithm. Method V is provided for solving the symbolic regression problem in step S13.

Method V starts with step S21. In this step, potential base functions are defined. The base functions that are listed in the table in FIG. 3 are preferably used. It is noted that the table is not a definitive list and may be supplemented by further mathematical functions, and that listed base functions of the table do not have to be used. The base functions are used in the course of method V. The listed "curves" and "maps" are preferably implemented in the implementation of method V by Smoothed Grid Regression (SGR) models. In this way, the interpolated values of a curve or map are provided by their parameters $a_1, \ldots, a_m$.

The 1D curve of the table may be a linear interpolation made up of multiple scan points. Similarly, the 2D curves are bilinear interpolations. The SGR model may adapt its value range automatically to the value range of its inputs.

In subsequent step S22: "Population," a population—a set of models including a predefinable number of models—based on the set of base functions and their assigned parameters is created on a stochastic basis.

Starting with this step, the models are preferably represented as directed graphs including a tree structure. Whereas the uppermost node of each graph represents its output, the non-terminal nodes are, in general, provided by the base functions from FIG. 3. The terminal nodes are either constant parameters or input variables. The process of graph creation is carried out by the methods listed below and may optionally be limited by the depth, size, and complexity of the graphs.

Each model in the population is referred to below by $F_i(a_i;x_1, \ldots, x_n)$, i being the indexing of the population members, $a_i$ being the parameters connected to this member, $x_j$ being the value for the input j.

During the optimization, the parameters are preferably assigned to each data set independently of one another. For this purpose, a dataset manager may be used, which knows which dataset is currently active and activates the corresponding set of free parameters. In the course of method V, the population develops from the evolution operations (step S26). Each iteration step in the main loop of method V (see "Y" branching in step S27) corresponds to one generation.

The size of the population, i.e., the number of models included in each population, may be 100 for example.

Different methods may be used for creating the population:
1. Each graph is created in such a way that it has a predefinable depth in all branches, or
2. Each graph is created in such a way that at least one branch has the predefinable depth.

A maximum complexity is preferably defined, so that no graph is created that exhibits a complexity greater than the maximum complexity. The complexity of a graph is an integer, which is the product of the sum of the complexities of all nodes, in particular, of the complexity of the base functions according to the table from FIG. 3, of which the graph is made up.

Furthermore, the maximum depth of the graphs and/or a maximum number of nodes of the graphs may also be established, for example, a maximum of 50 nodes.

In step S23, the dataset from step S11 or S12 is then used. The training dataset is used for the calculation of the output of each graph. The dataset is made up of m inputs $x_1, \ldots, x_m$ and respectively assigned outputs $y_{meas}$. Each model output $y_{mod}$ is calculated by $y_{mod}=F_i(a_i;x_1, \ldots, x_n)$.

This is followed by step S23: "Optimization". The output values of each graph are assigned to the measured output values and the parameters a of the graphs are subsequently optimized, so that the model output approximates the measured output variables. This may be carried out by an iterative optimization method. Second-order local optimization methods are advantageously used.

The optimization method may be carried out until convergence criteria of the optimization method are met or a maximum number of iterations has been achieved. If characteristic maps (see table in FIG. 3) are used, this necessarily results in a possible readjustment of its input value range and thus to its sampling points. The latter are therefore newly determined in each iteration, in order to equidistantly scan the range of the input values. To ensure numerical stability, both the functional values as well as the gradients are preferably limited to predefined value ranges and each node is treated separately.

Once step S23 has been completed, it is checked in step S24 whether an abort criterion is met. Method V is completed if either the value obtained by the function $OF_i(y_{mod}, y_{meas})$ for one of the models in the population is smaller than the abort threshold or the maximum number of generations is achieved.

If method V according to step S24 is further carried out, then step S25 follows, in which a fitness of the models is assessed.

The fitness may be calculated by the following fitness function:

$$\text{Fit}_i = \frac{1}{1 + OF_i(y_{mod}, y_{meas}) + \alpha P_i(\text{Model})}$$

$OF(y_{mod}, y_{meas})$ characterizing an efficiency and $\alpha P_i$(Model) defining the complexity of graph i using a factor $\alpha$.

The function $OF(y_{mod}, y_{meas})$ may, for example, be an RMSE (root mean squared error) or an MSE (mean squared error) or a mean value of the $L_1$ standard.

Once the fitness function has been calculated, a predefinable number of graphs is randomly or deterministically selected from the population of the graphs as a function of their fitness.

Step S25 is followed by step S26: "Evolution." The evolution step includes the graph modification operations: reproduction, expansion, mutation and crossover. This step is carried out using the graph selected in the previous step.

The following probabilities for the different graph modification operations determine how probable their application to this graph is.

Reproduction probability: probability with which the reproduction operation is carried out.

Expansion probability: probability of carrying out the expansion operation.

Mutation probability: probability that the mutation operation is carried out.

Crossover probability: probability that the crossover operation is carried out.

Reproduction: this operation ensures that graphs having a good fitness are transferred unchanged to the next generation.

Expansion: this method repeats the steps:
1. random selection of a terminal node of the graph,
2. creation of a new, random graph with the depth two,
3. replacement of the terminal node by the new graph.

These steps are repeated for a predefinable number of times. If at any point in time the expanded graph exhibits a better fitness than the best graph in the population, it is incorporated into the next generation. Otherwise, the original graph is incorporated in the present form for the next generation.

Mutation: a mutation of a graph is carried out using three different operations, each of them being applied to a randomly selected node of the graph:
1. The selected node is replaced by a random node including the same number of inputs, or
2. The selected node of the graph is replaced by a sub-tree, or
3. New tree: the selected node and all sub-nodes are replaced by a newly created graph having a maximum depth of, for example, three. How probable it is which of the three cited methods is applied is determined by a predefinable probability.

Crossover: the crossover operation is the recombination of two graphs to form one new graph. The operation is carried out by the following steps:
1. The previously selected graph is established as the target graph.
2. A second graph—the source graph—is selected from the population as a function of its fitness.
3. In both graphs, a node including all of its sub-nodes is randomly selected as a branch to be exchanged.
4. The branch in the target graph is replaced by the branch of the source graph. The resulting graph is incorporated into the population of the next generation.

Once step S26 has been completed, step S27 follows. In this step, it is checked whether a maximum population size has been achieved. If the maximum population size has not been achieved, step S26 is carried out again. Otherwise, step S22 is carried out again with its subsequent steps.

Possible applications of method V or of workflow W are explained below. Method V is suitable, in general, for all embedded control-related applications, which include a modeling of a system to be controlled, for example, model-predictive regulation. Example areas of application are:
1. Engine control for achieving a defined engine behavior. Specific application examples may be:
   a) creating a model for modeling a cylinder charge or a relative load of internal combustion engines as a function of at least one engine speed, inlet pressure, inlet gas density, inlet valve opening and/or closed position, outlet valve opening and closed position and/or outlet pressure.
   b) Creating a model for modeling the engine torque of internal combustion engines as a function of at least the engine speed, the cylinder charge (engine mass or relative load) and/or the ignition angle.
   c) Modeling the air mass of the turbine behind the turbocharger of an internal combustion engine as a function of at least the temperature of the exhaust manifold, of the pressure in the exhaust manifold, of the temperature behind the turbine, of the pressure behind the turbine, of the speed of the turbocharger and/or of the control signal of the bypass valve.
2. Creating a model for modeling power loss effects in electric machines, in particular electric motors, as a function of at least one motor rotation speed, a direct current, a quadratic current and/or the motor temperature.
3. Creating a model for modeling hydraulic system components, for example, for pilot control:
   a) modeling the control pressure difference via an axial piston pump as a function of high pressure difference, pump speed and opening angle.
   b) Models of a hydraulic line, which may be solved analytically in the frequency range, may be transformed into the time range.

It is noted that the described models of the aforementioned possible applications may then also be used for controlling the aforementioned technical systems, in particular, if a control strategy is capable of being created using the models.

4. Creating a model for modeling properties of a tool, for example, for a given tool such as a drill that generates a torque, the dependency between input current and generated torque may be modeled.
5. Model reduction. A given complex model of a technical system may be reduced to a simple and compact model using method V. The dataset may, for example, be provided by the complex model.

In one further exemplary embodiment of the present invention, the model created according to method V or to workflow W may be used in a control system 40 that includes a sensor 30 and an actuator 10.

In one preferred specific embodiment of the present invention, the control system includes a single processor or a plurality of processors and at least one machine-readable memory medium, on which the model is stored.

In alternative specific embodiments of the present invention, a display unit 10a is provided, alternatively or in addition to actuator 10.

Figure 4:
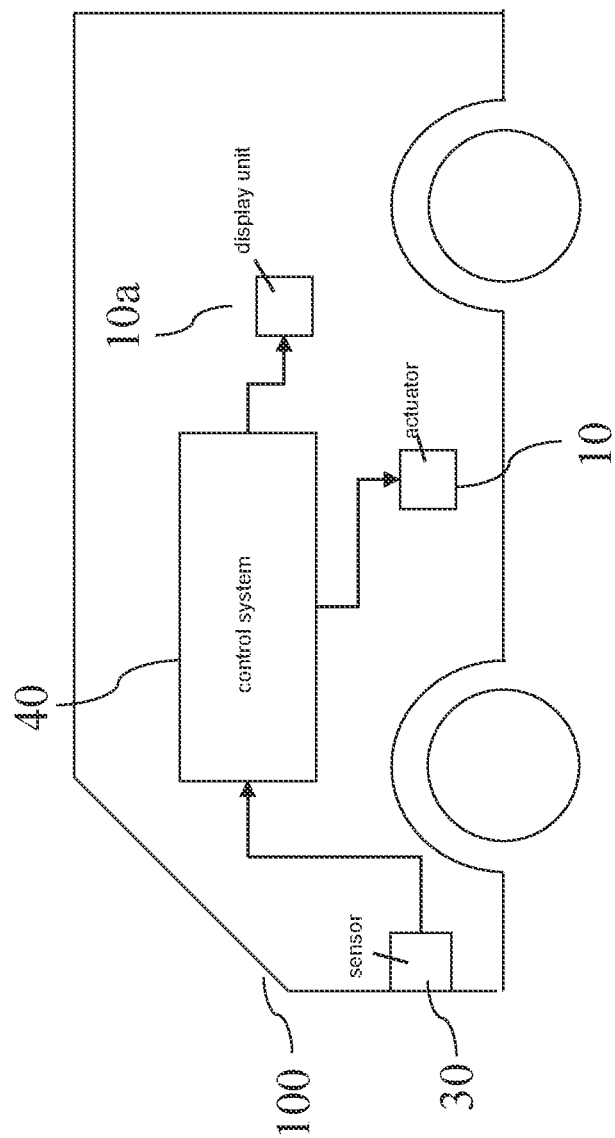
FIG. 4 schematically shows one exemplary embodiment for activating an at least semi-autonomous robot, in accordance with the present invention.

FIG. 4 shows how the control system for controlling an at least semi-autonomous robot, in this case, an at least semi-autonomous motor vehicle 100, may be used.

Alternatively, the at least semi-autonomous robot may also be another mobile robot (not depicted), for example, one which travels by flying, floating, diving or stepping. The mobile robot may, for example, be an at least semi-autonomous lawn mower or an at least semi-autonomous cleaning robot.

Figure 5:
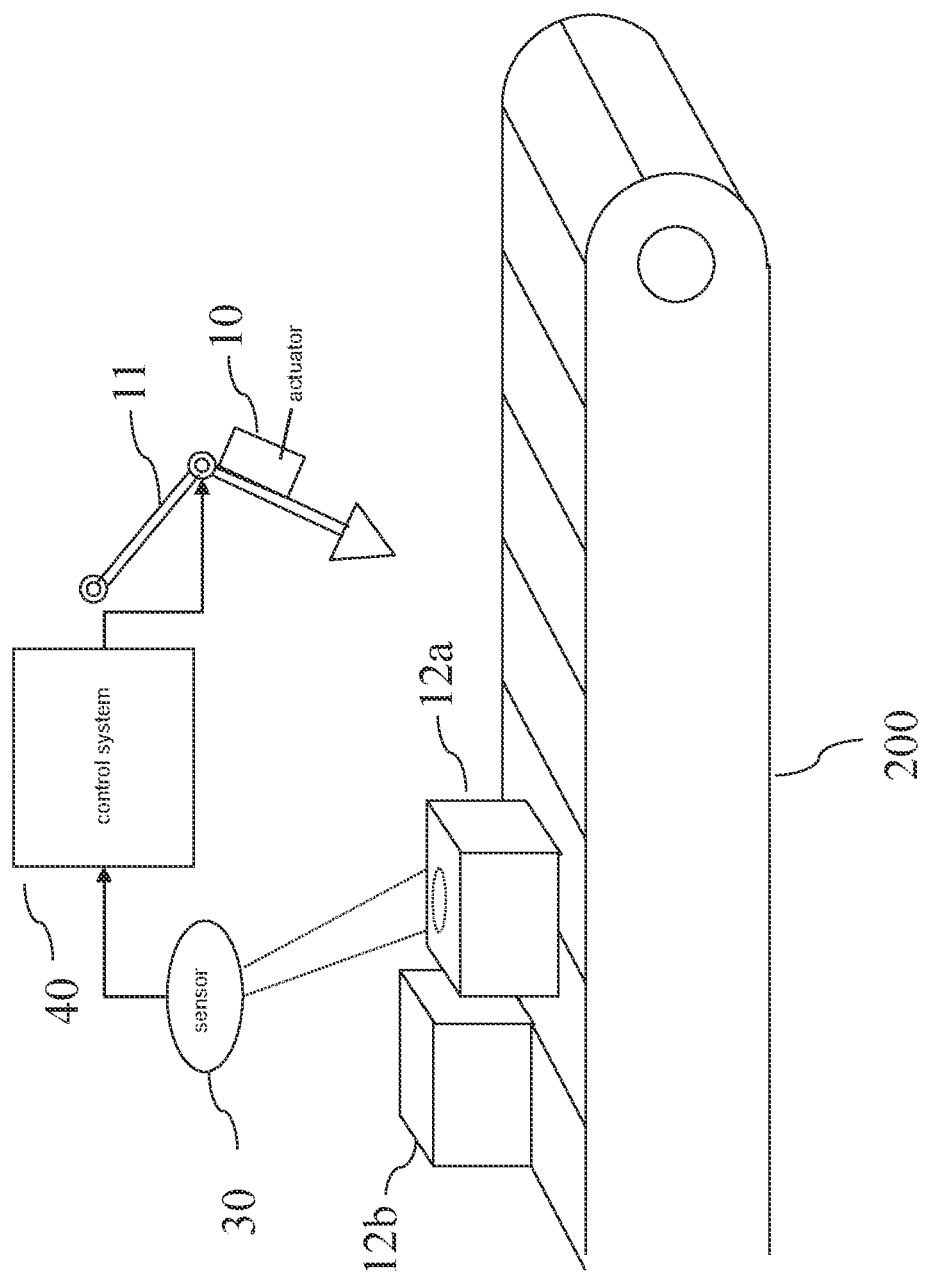
FIG. 5 schematically shows one exemplary embodiment for activating a manufacturing system, in accordance with the present invention.

FIG. 5 shows one exemplary embodiment of the present invention, in which control system 40 is used for activating a manufacturing machine 11 of a manufacturing system 200 by activating an actuator 10 that controls this manufacturing machine 11. Manufacturing machine 11 may, for example, be a machine for punching, sawing, drilling and/or cutting.

Sensor 30 may, for example, be an optical sensor which, for example, detects properties of manufactured products 12a, 12b. It is possible that these manufactured products 12a, 12b are movable. It is possible that actuator 10 controlling manufacturing machine 11 is activatable as a function of an assignment of detected manufactured products 12a, 12b, so that manufacturing machine 11 accordingly carries out a subsequent processing step of the correct one of manufactured product 12a, 12b. It is also possible that manufacturing machine 11 accordingly adapts the same manufacturing step for a processing of a subsequent manufactured product by identifying the correct properties of the same one of manufactured products 12a, 12b (i.e., without an erroneous assignment).

Figure 6:
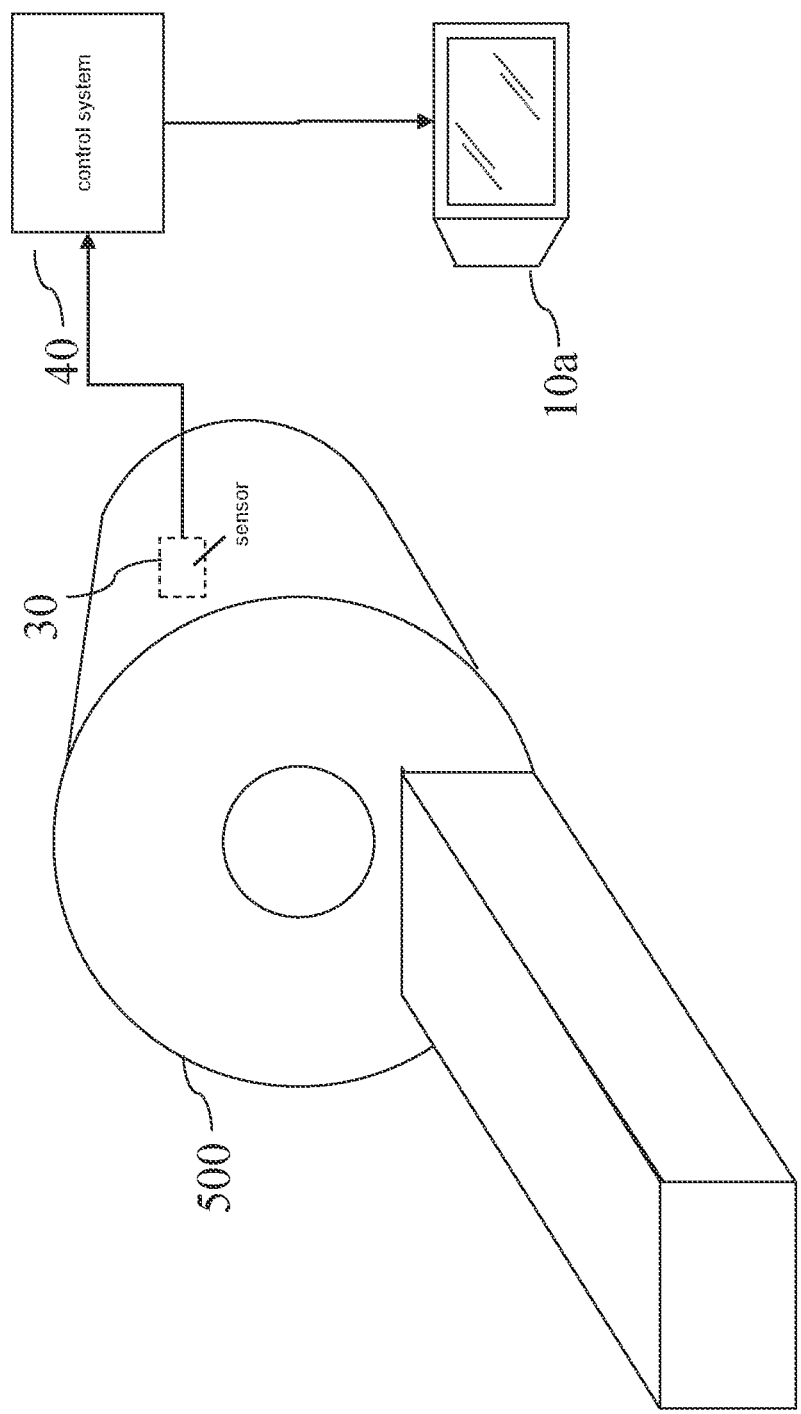
FIG. 6 schematically shows one exemplary embodiment for activating a medical imaging system, in accordance with the present invention.

FIG. 6 shows one exemplary embodiment of the present invention, in which control system 40 is used for controlling a medical imaging system 500, for example, an MRT device, an x-ray device or an ultrasonic device.

What is claimed is:

1. A computer-implemented method for creating a model of a technical system as a function of measured sensor data of the technical system, the method comprising the following steps:
   providing the measured sensor data, which have been detected using different sensors;
   initializing a model generator;
   providing a list of mathematical functions including at least one linear and/or non-linear function and an at least one-dimensional parameterizable characteristic curve, the at least one-dimensional characteristic curve being implemented by a Smoothed Grid Regression Model (SGR);
   combining, using a genetic algorithm, multiple models with the mathematical functions from the list;
   optimizing each of the combined models in such a way that the models are able to calculate one of the measured sensor data as a function of others of the measured sensor data;
   assessing, by the genetic algorithm, each of the optimized models as a function of a fitness function, the fitness function being a function of an efficiency of the model to be assessed and a function of a complexity of the model; and
   outputting best ones of the models with respect to the fitness function as a function of their complexity;
   storing one of the output models on a control system including one or more processors;
   controlling the technical system to perform a physical function by activating an actuator of the technical system using the stored model, the technical system performing the physical function under control of the activated actuator.

2. The method as recited in claim 1, wherein the technical system is an electric motor or an internal combustion engine.

3. The method as recited in claim 1, wherein a local second-order optimizer is used to optimize the combined models with respect to their efficiency.

4. The method as recited in claim 1, wherein a model is selected from the output best models by a statistical analysis of data residues.

5. The method as recited in claim 1, wherein a user selects one of the output best models as a function of the fitness function and of the complexity.

6. The method as recited in claim 1, wherein an input value range of the combined models is adapted during the optimization.

7. The method as recited in claim 1, wherein an input value range of the combined models, for each iteration step, is adapted during the optimization.

8. The method as recited in claim 1, wherein a portion of the mathematical functions of the list is predefined by a user as a function of a priori knowledge about the technical system and/or about the measured sensor variables.

9. The method as recited in claim 1, wherein the control system ascertains a control variable for the technical system using the stored model.

10. A non-transitory machine-readable memory element on which is stored a computer program for creating a model of a technical system as a function of measured sensor data of the technical system, the computer program, when executed by a computer, causing the computer to perform the following steps:
    providing the measured sensor data, which have been detected using different sensors;
    initializing a model generator;
    providing a list of mathematical functions including at least one linear and/or non-linear function and an at least one-dimensional parameterizable characteristic curve, the at least one-dimensional characteristic curve being implemented by a Smoothed Grid Regression Model (SGR);
    combining, using a genetic algorithm, multiple models with the mathematical functions from the list;
    optimizing each of the combined models in such a way that the models are able to calculate one of the measured sensor data as a function of others of the measured sensor data;
    assessing, by the genetic algorithm, each of the optimized models as a function of a fitness function, the fitness function being a function of an efficiency of the model to be assessed and a function of a complexity of the model;
    outputting best ones of the models with respect to the fitness function as a function of their complexity;
    storing one of the output models on a control system including one or more processors;
    controlling the technical system to perform a physical function by activating an actuator of the technical system using the stored model, the technical system performing the physical function under control of the activated actuator.

11. A system comprising a control system including one or more processors, and a device configured to create a model of a technical system as a function of measured sensor data of the technical system, the device configured to:
    provide the measured sensor data, which have been detected using different sensors;
    initialize a model generator;
    provide a list of mathematical functions including at least one linear and/or non-linear function and an at least one-dimensional parameterizable characteristic curve, the at least one-dimensional characteristic curve being implemented by a Smoothed Grid Regression Model (SGR);
    combine, using a genetic algorithm, multiple models with the mathematical functions from the list;
    optimize each of the combined models in such a way that the models are able to calculate one of the measured sensor data as a function of others of the measured sensor data;
    assess, by the genetic algorithm, each of the optimized models as a function of a fitness function, the fitness function being a function of an efficiency of the model to be assessed and a function of a complexity of the model; and output best ones of the models with respect to the fitness function as a function of their complexity;

store one of the output models on the control system;

wherein the control system is configured to control the technical system to perform a physical function by activating an actuator of the technical system using the stored model, the technical system performing the physical function under control of the activated actuator.

12. The method as recited in claim 1, wherein the technical system is an at least semi-autonomous robot or a manufacturing machine or a medical imaging system.

13. The method as recited in claim 1, wherein the control system further includes a sensor.

* * * * *